United States Patent Office.

SAMUEL MORRIS LILLIE, OF PHILADELPHIA, PENNSYLVANIA, ASSIGNOR TO THE SUGAR APPARATUS MANUFACTURING COMPANY, OF SAME PLACE.

PROCESS OF UTILIZING HEAT IN THE MANUFACTURE OF SUGAR AND SALT.

SPECIFICATION forming part of Letters Patent No. 486,983, dated November 29, 1892.

Application filed May 4, 1886. Serial No. 201,106. (No specimens.)

*To all whom it may concern:*

Be it known that I, SAMUEL MORRIS LILLIE, of the city and county of Philadelphia, State of Pennsylvania, have invented a new and useful Improvement in the Process of Sugar-Refining, which consists in introducing the step of evaporating sea-water by means of the heat usually employed to heat the water and condensing the vapors and employing the hot water which results for the usual purposes in the refining processes, while the salt is separated and saved, of which process the following is a specification.

Sugar-refining demands large quantities of hot fresh water for the washing of bone-black after filtrations of sugar liquor through it and in less quantities for dissolving raw sugars, diluting sirups, &c. It is advantageous to have the water used for dissolving the raw sugars as pure and free from salts in solution as possible on account of the property which many salts possess of preventing the crystallization of sugar from its solutions, and which consequently if contained in the water used in dissolving the raw sugars in a refinery will lessen the yield of the refined sugar and increase the production of the molasses (which is undesirable) in proportion to the amount of the salts in solution in the water. It is also desirable that the water used in washing the bone-black should be as free from suspended impurities and from salts in solution as possible, for the reasons that the former tend to fill the pores of the black and to thereby lessen its decolorizing power after revivification and that the latter, or some of them, being absorbed into the pores of the black during the washing of the same, have an injurious chemical action upon it during the subsequent reburning and also upon the sugar liquors of the following filtrations. Sulphates and sulphites may be instanced as being undesirable in water used for washing bone-black.

Refineries located in seaport cities are dependent upon the city supply for the fresh water used by them, upon which a tax has to be paid, amounting usually to a very considerable sum annually, and which has to be accepted whatever its degree of purity may be. Before being used in the refinery for washing bone-black, &c., this water must be heated to the neighborhood of 212° Fahrenheit.

The object of my invention is to render such refineries independent of the cities for their supplies of fresh water and to enable them to obtain from the sea-water—which may be had at the cost of pumping—the hot water they may need in a practically-pure condition—*i. e.*, as distilled water; and the further objects of my invention are to enable them to do this and to obtain a valuable by-product — namely, salt or a concentrated brine—wholly or largely by the heat now used by them in heating the fresh water obtained from the city.

The process consists in evaporating the sea-water to a brine or to salt in a series of air-tight pans arranged and operated together as a multiple effect, the condenser of which is a surface condenser in which sea-water, afterward evaporated in a multiple effect, is used as the cooling agent, and in collecting the hot-distilled water from the several pans and in using it after additional heating, if necessary, for washing bone-black and for the other purposes of the refinery. The process consists, further, in using the hot distilled water after having passed through the black—*i. e.*, the "char-washings"—in a suitable surface heater for heating the sea-water preparatory to its being evaporated in the multiple effect.

The arrangement of a number of evaporators in a series and their operation as a multiple effect are so familiar that I will only state here that the heat which causes evaporation in the system is applied to the first or hottest pan in the series and causes evaporation in it, that the vapors from this pan are the source of heat for the evaporation of the next coolest pan of the series, and that, similarly passing down the series, the vapors of each pan are the source of heat for the evaporation in the next lower pan, excepting in the case of the last pan, whose vapors go in the apparatus I purpose using to a surface condenser in which the cooling agent in this process is sea-water which is afterward to be evaporated in the multiple effect.

In the practicing of my process the heat applied to the first pan is dispersed among and is contained in the following products of the process, viz: first, in the distilled water condensed in the several pans; second, in the sea-water which flows through the condenser; third, in the salt or brine resulting from the evaporation. The heat contained in the third item—viz., in the salt or brine produced—is small in comparison with the total amount, far the greater portion of the heat being collected in the other two. The heat contained in the condenser-water is that carried into it by the vapors from the last pan, and this amount will be less the greater the number of pans in the series. The remainder of the heat is contained in the hot distilled water, which is collected from the pans and used in the refinery for washing black, dissolving sugars, &c. The greater the number of pans in the system the less will be the amount of heat carried to the condenser from the last pan of the series and the less cold sea-water will be required to be passed through the condenser. If the number of pans is sufficiently great, no more sea-water will be needed for the condenser than is afterward evaporated in the multiple effect, and as the condenser-water is the water evaporated in the multiple effect this heat will be returned to the multiple effect, and consequently no heat be lost to the system by the condenser. In this case all of the heat applied to the system for heating and evaporating is collected in the hot distilled water from the various pans and condenser, with the exception of the small amount of heat contained in the concentrated brine and salt resulting from the evaporation, and also with the exception of that lost from the apparatus by radiation and conduction. Working with this number of pans, the heated distilled water resulting is furnished to the sugar-refinery at the expenditure of but little more heat than would have been required to raise the fresh city-water, which would otherwise be used, to the same temperature, and so with but little increase in the consumption of fuel in the refinery. Whatever may be the number of pans, the heat in the distilled water delivered to the refinery is heat that is used both in the manufacture of salt, in the refining of sugar, and in the production of pure distilled water for the purposes of the refinery; or, in other words, the heat which has heretofore been used in refineries in heating fresh water is made to serve three useful purposes, viz: It aids in supplying the fresh water, in heating the fresh water, and in furnishig a valuable product—i. e., salt or concentrated brine. The greater portion of the hot distilled water thus furnished to the refinery is used in washing bone-black, and as it runs from the black it is passed, as another step in my process, through a suitable surface-heater, in which it gives up a certain portion of its heat to sea-water simultaneously passing through the heater, which sea-water, partially heated thereby, is evaporated in the multiple effect. By this last step in the process the heat in the distilled water delivered by the multiple effect is returned to the latter in great part and is used again in the manufacture of salt or brine, with the result of lessening the amount of extraneous heat used in the system.

The number of pans in the multiple effect, as well as the operation of the system, may be varied, and I do not limit myself to any special number of pans, nor to any special way of manipulating them in the practicing of my process. It is apparent that should a sugar-refinery be located in any instance near a supply of any other saline solution than sea-water such solution might be used in the place of the sea-water named in the specification, and I consequently do not limit myself to sea-water as the solution treated by this process.

Thus, having described my invention, I claim as mine—

1. The within-described improvements in the process of sugar-refining and in the manufacture of salt or brine from salt-water, consisting, first, in evaporating the salt-water to separate and save the salt or brine by an evaporation in which the water-vapors from the evaporating salt-water are condensed to comparatively-hot distilled water in heating or evaporating the salt-water, and, second, in collecting the hot distilled water resulting from the said evaporation and in washing bone-black, dissolving sugars, &c., in the process of sugar-refining with the same, the distilled water serving as a carrier of the heat used in the manufacture of the salt or brine into the sugar-refining processes and as the medium of its use in the latter, subtantially as specified.

2. The within-described improvements in the process of sugar-refining and in the manufacture of salt or brine from salt-water, consisting, first, in evaporating the salt-water to separate and save the salt or brine by an evaporation in which the water-vapors from the evaporating salt-water are condensed to comparatively-hot distilled water in heating or evaporating the salt-water; second, in collecting the hot distilled water resulting from the said evaporation and in washing boneblack with the same after a filtration of sugar liquor through the black in the process of sugar-refining, and, third, in again collecting the said hot distilled water after it has been used in washing the bone-black and in heating with it the salt-water preparatory to the evaporation of the latter for the production of salt or brine, the distilled water serving as a carrier of heat used in the manufacture of salt or brine into the sugar-refining processes and again as a carrier of the same heat back into the salt or brine making process, substantially as and for the purpose specified.

S. MORRIS LILLIE.

Witnesses:
 MORRIS R. BOCKIUS,
 A. B. ROSS.